(12) United States Patent
Naguib et al.

(10) Patent No.: US 7,555,945 B2
(45) Date of Patent: Jul. 7, 2009

(54) MASS AIR FLOW SENSOR HAVING OFF AXIS CONVERGING AND DIVERGING NOZZLES

(75) Inventors: Ahmed M. Naguib, Ann Arbor, MI (US); Antonius Aditjandra, Willoughby, OH (US); Barry Trosin, Waterford, MI (US); Harold J. Schock, Okemos, MI (US); Thomas R. Stuecken, Eagle, MI (US); Edward Timm, Williamston, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 11/893,105

(22) Filed: Aug. 14, 2007

(65) Prior Publication Data

US 2008/0141765 A1 Jun. 19, 2008

Related U.S. Application Data

(60) Provisional application No. 60/837,579, filed on Aug. 14, 2006.

(51) Int. Cl.
*G01F 1/68* (2006.01)
(52) U.S. Cl. ................................. 73/204.27
(58) Field of Classification Search ............. 73/861.63, 73/204.21
See application file for complete search history.

(56) References Cited

U.S. PATENT DOCUMENTS

| | | | | |
|---|---|---|---|---|
| 3,817,100 A | * | 6/1974 | Anderson et al. | 73/861.63 |
| 4,282,751 A | * | 8/1981 | Brown et al. | 73/202 |
| 4,433,576 A | * | 2/1984 | Shih et al. | 73/204.21 |
| 4,463,601 A | * | 8/1984 | Rask | 73/114.32 |
| 4,528,847 A | * | 7/1985 | Halmi | 73/195 |
| 5,383,357 A | | 1/1995 | Doll | |
| 5,563,340 A | | 10/1996 | Clowater et al. | |
| 5,631,417 A | | 5/1997 | Harrington et al. | |
| 5,827,960 A | | 10/1998 | Sultan et al. | |
| 6,058,787 A | * | 5/2000 | Hughes | 73/861.63 |
| 6,267,006 B1 | | 7/2001 | Bugli et al. | |
| 6,508,117 B1 | | 1/2003 | DuBois et al. | |
| 6,698,297 B2 | * | 3/2004 | Gysling | 73/861.63 |
| 6,701,781 B1 | | 3/2004 | Lutowsky, Jr. et al. | |
| 6,820,480 B2 | * | 11/2004 | De'Stefani et al. | 73/204.18 |
| 6,871,534 B1 | | 3/2005 | Hamada et al. | |
| 6,898,986 B2 | * | 5/2005 | Daniel et al. | 73/861.63 |
| 6,910,388 B2 | * | 6/2005 | Jones | 73/861.63 |
| 7,047,805 B2 | * | 5/2006 | Zurek et al. | 73/202.5 |

\* cited by examiner

*Primary Examiner*—Harshad Patel
(74) *Attorney, Agent, or Firm*—Harness, Dickey & Pierce, P.L.C.

(57) ABSTRACT

A mass air flow sensor for an internal combustion engine is provided. The sensor has a pair of opposed nozzles. A converging nozzle has a first conical throughbore having a first throughbore axis, the first throughbore has first and second apertures, the first aperture has a diameter greater than the second aperture. The diverging nozzle has a second conical throughbore having a second through axis. The throughbore has third and fourth apertures, with the third aperture having a diameter greater than the fourth aperture. A first hotwire sensor positioned within the first aperture. A second hotwire sensor positioned within the second aperture.

25 Claims, 5 Drawing Sheets

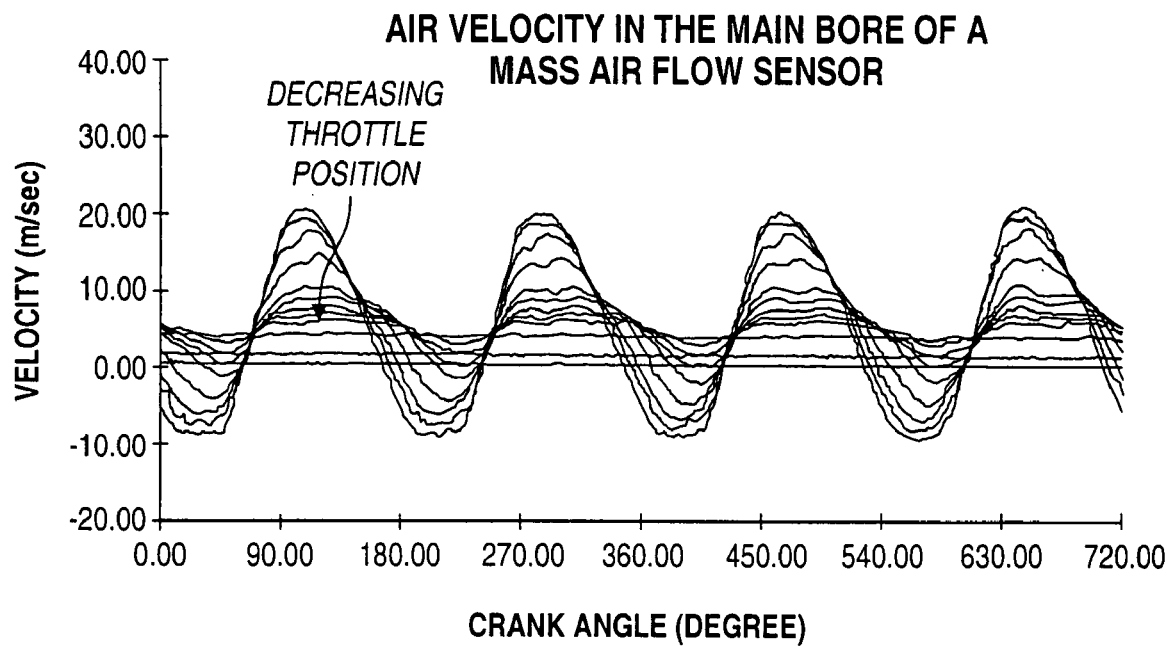
FIG. 1
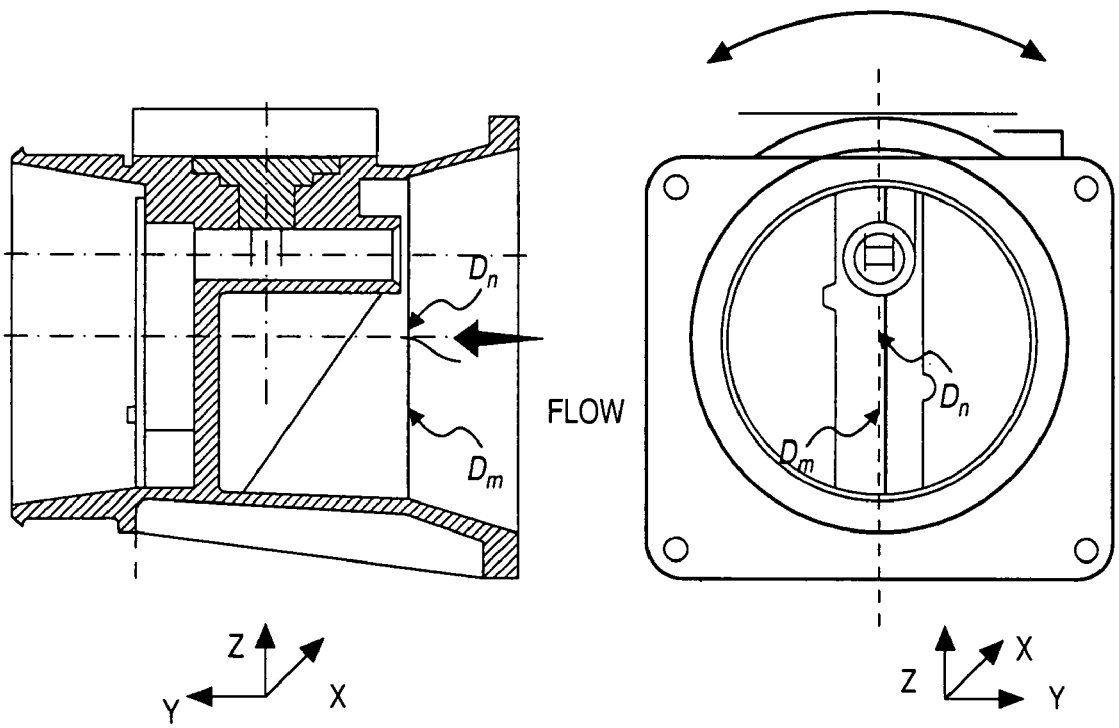
FIG. 2A
Prior Art
FIG. 2B
Prior Art

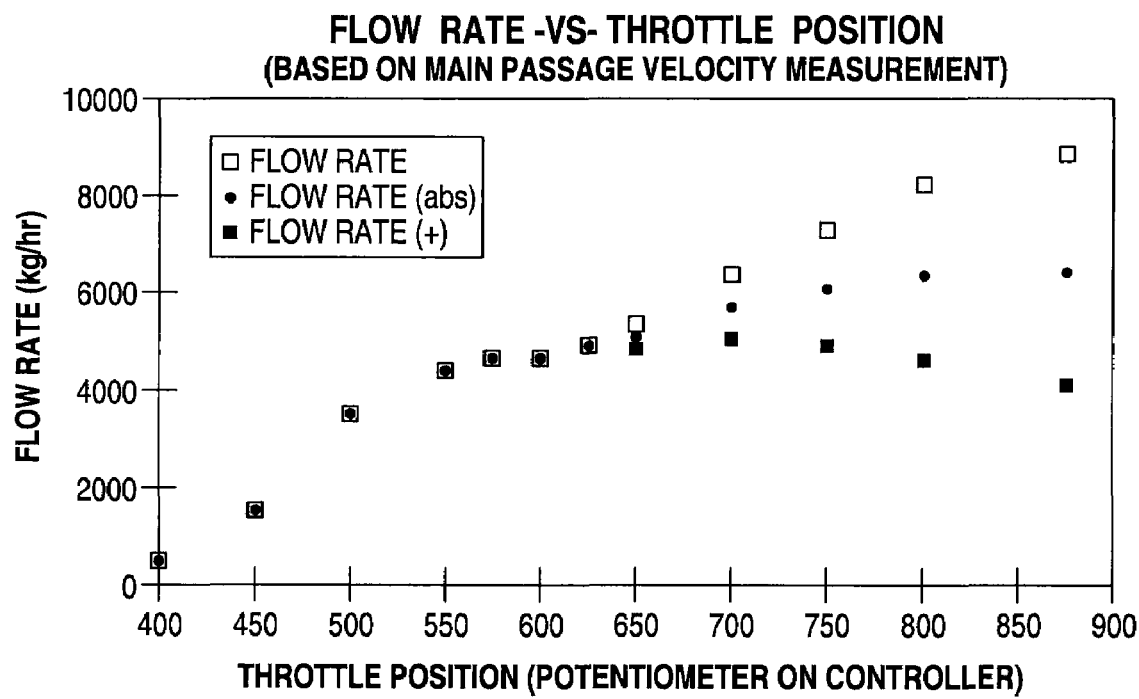
Prior Art  FIG. 3A
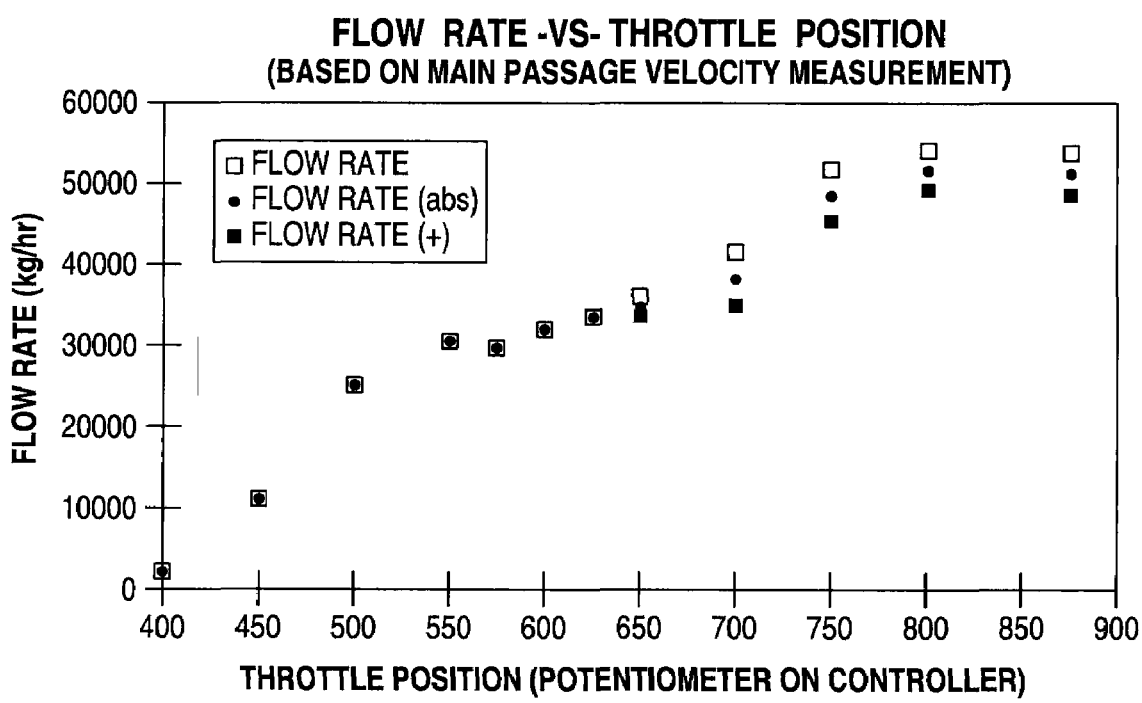
Prior Art  FIG. 3B

MASS AIR FLOW SENSOR HAVING OFF AXIS CONVERGING AND DIVERGING NOZZLES

CROSS-REFERENCE TO RELATED APPLICATIONS

This application claims the benefit of U.S. Provisional Application No. 60/837,579, filed on Aug. 14, 2006. The disclosure of the above application is incorporated herein by reference.

FIELD

The present disclosure relates to air flow sensors and, more particularly, to a bi-directional mass air flow sensor for use in a combustion engine.

BACKGROUND

The statements in this section merely provide background information related to the present disclosure and may not constitute prior art.

Competition in the automotive industry has increased the need to develop technology for superior engines. Electronic monitoring and microsecond control systems provide a level of sophistication and performance that has not previously been available in automotive engines. Accurate input to these control systems has become an important priority. Of particular relevance is the precise control of the air-fuel ratio. Electronic port fuel injectors have nearly become standard on today's modern engine. These devices have achieved a very high degree of reliability and accurate fuel delivery control. Combustion air control is equally important, and the measurement of this air flow is done with a mass air flow sensor or a manifold absolute pressure sensor.

FIG. 1 shows an example of the induction air velocity downstream of the air cleaner in the induction system of a production four cylinder internal combustion engine. Shown are regions of negative and positive flows. Although the mass air flow sensor unit has the advantage of measuring the mass air flow rate directly, special problems arise in the measurement of this combustion air in that traditionally only part of the intake stream is sampled and the total mass flow is estimated from this bypass fraction. FIG. 1 shows the flows in the bypass tube and main bore of traditional mass air flow sensors. Shown are comparisons of the bypass flows with total mass flows in the main bore at various engine speeds with different throttle positions under motoring and firing conditions. FIG. 1 additionally shows a typical example of air flow in the induction system of an engine under normal operating conditions. Complicated induction system flows make an accurate correlation of bypass flow to total flow a difficult problem, particularly in operating regions which exhibit flow reversals. FIGS. 2A and 2B show an example of a prior art typical mass air flow sensor assembly having a single hotwire sensor which measures the mass flow of air passing through the air intake by measuring changes in resistance caused by heat loss.

The graph shows mass air flow sensor signals measured along with crank angles over a range of throttle positions. The mass air flow sensor signals were measured to be compared with velocities measured by laser doppler velocimetry in the main base and the bypass tube of the mass air flow sensor assembly. This comparison can be used to determine the differences of the sensitivity and response time between the laser doppler velocimetry system and the mass air flow hotwire sensor.

FIGS. 3A and 3B show total flow rates calculated based on the average velocity over 720 crank angle degrees across unit sectional area. Here, flow rate (+) means a flow rate calculation based only on the positive velocities, while flow rate (abs) is calculated based on the average velocities of absolute values of measured velocity. The flow rate without a parenthetical notation stands for net the flow rate. For lower than 50% of throttle position, these three flow rates are identical because no backflow exists in those throttle positions. For higher than 50% of throttle position, the backflow affects the flow rate in main bore. The net flow rate was decreased with increasing the throttle position at throttle position higher than 50%.

A similar trend was found when the measured flow just upstream of the bypass was used to calculate total flow rate. Since the backflow at the entrance to the bypass is small, the effect of backflow is small on the flow rate in the bypass. The net flow rate through the bypass increases when the throttle position increases with the flow rate (abs) and the flow rate (+). This is different from the flow rate in the main bore.

A mass air flow sensor which can provide the current net flow rate into an engine assembly will promote enhanced control of air-fuel ratios in the combustion chamber of an internal combustion engine. This has particular significance for: Premix gasoline engines operating above mid throttle position; diesel engines especially during transients; stratified charge spark ignition engines; in all engines which have variable cam timing the calibration effort can be substantially reduced by implementation of an accurate mass air flow sensor.

SUMMARY

It is an object of the present invention to overcome the disadvantages of the prior art. As such, a mass air flow sensor is provided which has a first sensing element configured to provide a first signal when air flow is in a first direction and provide a second signal when air flow is in a second direction; and, a second sensing element configured to provide a third signal when air flow is in the first direction and provide a fourth signal when air flow is in the second direction. The first sensing element has a first converging conical flow passage, while the second sensing element has a second diverging conical flow passage. Each sensor has an associated hot-wire velocity probe.

In one embodiment to the invention, the mass air flow sensor has a first sensing element with a converging nozzle having a first open end with a first diameter and a second open end with a second diameter which is less than the first diameter. The hotwire sensor is disposed proximate to the first open end. Differences in the measured resistances from the hotwire velocity probe is used to calculate the difference in flow, and as such, are used to calculate both the mass flow and the direction of the flow within the mass air flow sensor.

In another embodiment, the mass air flow sensor has a converging nozzle, having a first conical throughbore with first and second apertures, the first aperture having a diameter greater than the second aperture. The sensor also has a diverging nozzle having a second conical throughbore with third and fourth apertures, said third aperture having a diameter greater than the fourth aperture. A first hotwire sensor is positioned within the first aperture and a second hotwire sensor is positioned within the third aperture.

In another embodiment, a mass air flow sensor for an internal combustion engine has a converging nozzle having a first conical throughbore having a first throughbore axis. The first throughbore has first and second apertures; the first aperture has a diameter greater than the second aperture. A diverging nozzle is provided having a second conical throughbore having a second through axis, the second conical throughbore has third and fourth apertures, said third aperture has a diameter greater than the fourth aperture. A first flow sensor is positioned within the first aperture, and a second flow sensor is positioned within the second aperture.

In another embodiment, an internal combustion engine is taught having an air intake and a mass air flow sensor disposed within the air intake. The mass air flow sensor has a converging nozzle having a first conical throughbore having a first throughbore axis. The first throughbore has first and second apertures, the first aperture having a diameter greater than the second aperture. The mass air flow sensor also has a diverging nozzle having a second conical throughbore with a second through axis. The second throughbore has third and fourth apertures with the third aperture having a diameter greater than the fourth aperture. A first hotwire sensor is positioned adjacent to the first aperture, and a second hotwire sensor is positioned adjacent the third aperture.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 represents a graph of the air velocity and a main bore of a mass air flow sensor;

FIGS. 2A and 2B represent a prior art mass of air flow sensor;

FIGS. 3A and 3B represent flow within a prior art mass air flow sensor;

DETAILED DESCRIPTION

Figure 4A:
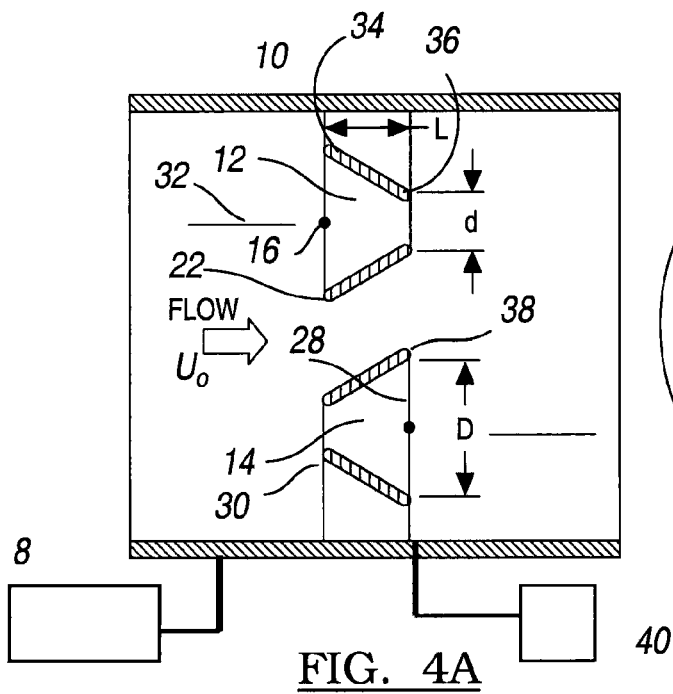
FIGS. 4A and 4B represent views of the mass air flow sensor according to the teachings of the present invention.

The following description is merely exemplary in nature and is not intended to limit the present disclosure, application, or uses. It should be understood that throughout the drawings, corresponding reference numerals indicate like or corresponding parts and features.

Figure 4B:
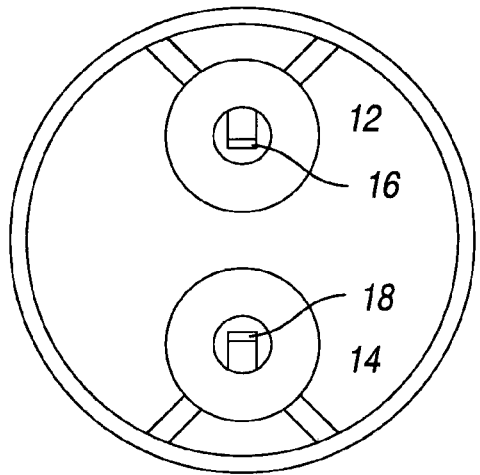

The mass air flow sensors 10 shown in FIGS. 4A and 4B are configured to measure unsteady, direction-reversing, mass flow rate as shown in FIG. 1. It is envisioned the sensor 10 will be integrated on engines 8 for 1implementation of the advanced engine control.

The sensor utilizes a pair of variable-area inserts or nozzles 12, 14; each variable-area insert is associated with one of two hotwire sensors 16, 18 to accelerate/decelerate the flow locally around the sensors (see FIGS. 4A and 4B). The variable-area inserts function as a diffuser or nozzle, depending on the flow direction of the gas being measured. For instance, if the flow direction is as indicated in FIG. 4A, the first variable insert 12 acts as a nozzle or converging nozzle and variable insert 14 acts as a diffuser or diverging nozzle, with one hotwire 16, 18 placed at the center of the large area of each of the variable inserts. When the flow of air if reversed, first variable area insert 12 functions as a diffuser or diverging nozzle while the second functions as a nozzle or converging nozzle. The angle of the diffuser is deliberately chosen to be steep, forcing the flow to separate at the entrance, and making the diffuser operate in the "jet" regime. This is done in order to avoid the unsteady effects associated with internal diffuser separation and the generally poor performance of diffusers at low Reynolds numbers. It is important, however, to keep the length of the variable insert 12, 14 less than twice the small-area diameter (i.e., L/d<2; see FIG. 4A for definition of terms) in order to ensure that the measurements are done within the potential core of the jet, and avoid the influence of turbulence in the shear-layer surrounding the core.

The first variable insert 12 has a converging nozzle has a first conical throughbore 20 with first and second apertures 22, 24. The first aperture 22 has a diameter greater than the second aperture. The second variable insert 14 has a second conical throughbore 26 with third 28 and fourth apertures 30. The third aperture 28 has a diameter greater than the fourth aperture 30. A first sensor 16 is positioned adjacent to or within the first aperture 22. A second sensor 18 is positioned adjacent to or within the second aperture 24.

The first and second conical throughbores 20, 26 define first and second through axis the first axis is parallel to the second axis 30, 32. The first aperture 22 defines a first surface 34 and the second aperture 24 defines a second surface 36, said first and second surfaces 34, 36 being parallel. The third aperture 28 defines a third surface 38 said first and third surface being parallel. The first throughbore 20 has a first length $L_1$ and the second throughbore 26 has a second length $L_2$ equal to the first length $L_1$. The first length $L_1$ is greater than the first diameter divided by the second diameter.

The system further has a processor 40 for receiving a first signal indicative of a first flow rate in a first direction from the first sensor 16 and second signal from the first sensor 16 indicative of a first flow rate in an opposite direction. The processor additionally receives a third signal from the second sensor 18 indicative of the flow rate. The processor 40 determines the difference or sum of the first and third signals. The processor 40 can additionally apply a scaling factor or function to the measured signals or the difference of the signals.

Sensors 16 and 18 designate a cylindrical flow rate detecting element. The cylindrical flow rate detecting sensors 16 and 18 may be prepared by winding a platinum wire as a heat-sensitive resistor on a ceramic pipe in coiled fashion, or by depositing a platinum film on a ceramic pipe and subjecting the ceramic pipe to spiral cut. The sensors 16, 18 are heated to be warmer than the temperature of a fluid by a predetermined temperature, and the heating current to the sensors 16, 18 can be used as a signal indicative of a flow rate.

In the jet regime, the hotwire sensors 16, 18 at the exit of the diffuser measures a velocity that is slightly higher than the main-stream velocity ($U_o$) because of the narrowing of the potential core. On the other hand, at the entrance of the nozzle, hotwire sensor 16 senses a velocity that is significantly lower than the main-stream velocity. For an ideal, inviscid flow, the velocity at the entrance of the nozzle would be that of the main stream divided by the variable inserts 12, 14 area ratio (where the area ratio is defined as $D^2/d^2$ for a circular geometry). In the actual flow, the deceleration at the entrance to the nozzle is lower than given by the area ratio, but the degree of deceleration is still related to the area ratio. Thus, the latter could be used at the design stage to increase/decrease the deviation of the velocity measured by hotwire sensor 16 from $U_o$. It should be noted that the flow deceleration at the entrance to the variable insert nozzle occurs because the pressure at the exit of the variable insert nozzle is forced to be the same as that of the main (approaching) stream, and hence the velocity at the exit of the variable insert nozzle will be similar to the main-stream velocity. Consequently, the area variation, in conjunction with mass conservation, will force the velocity through the large area to be slower than through the smaller one, leading to deceleration below $U_0$.

Based on the above description, it is clear that the output voltage of hotwire sensor 18 is larger than that of hotwire sensor 16 for the flow direction indicated in FIG. 4A. The opposite would be true for the flow in the reverse direction. Thus, the flow direction could be detected from the difference of the two voltages and the velocity magnitude could be estimated from either voltage, or their sum. Unlike the dual-sensor mass flow sensors, however, the flow acceleration/deceleration is achieved without introducing flow unsteadiness. Any flow unsteadiness that is observed (see below) is significantly lower than the difference between the outputs of the hotwires, thus guaranteeing proper detection of the velocity direction and magnitude.

Figure 5:
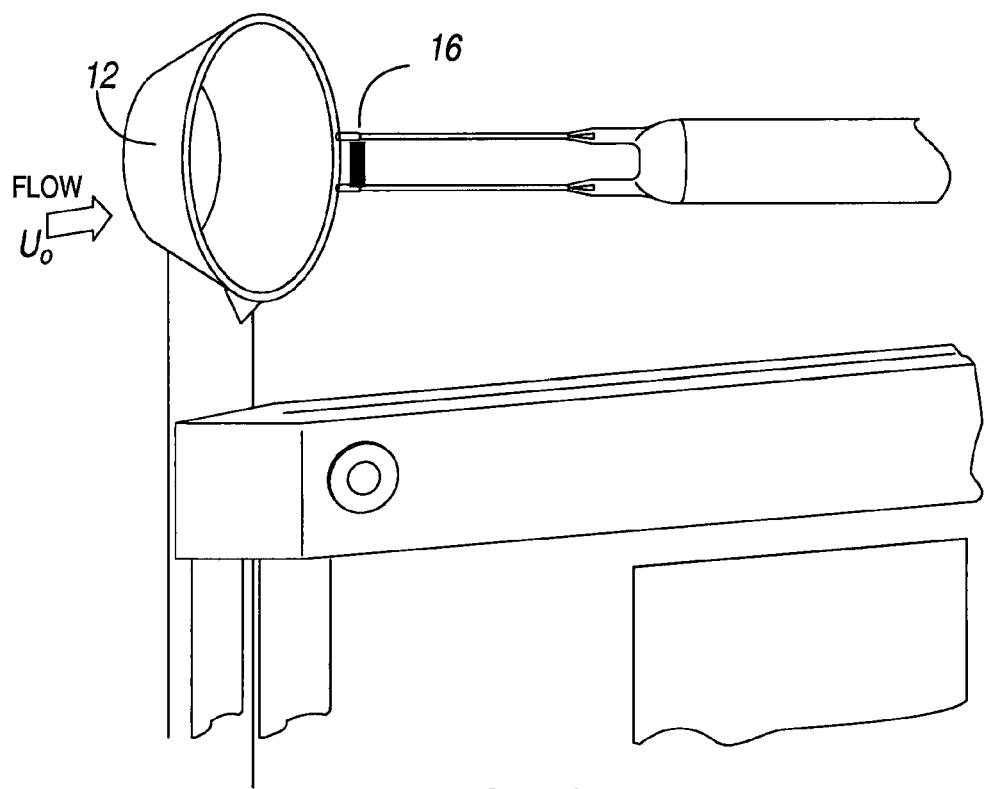
FIG. 5 represents an experimental reduction to practice of the present invention.

Proof of the variable insert mass air flow sensor design was conducted in a wind tunnel prior to construction of a full sensor for use in the HECC engine. The test involved construction of a variable-area insert with d=11.1 mm, D=16 mm and L=6.3 mm, which was held in the freestream inside the test section as shown in FIG. 5. A hotwire probe 16 was used to measure the velocity at the center of the large-area of the variable insert for two different orientations of the variable insert. One orientation corresponded to the nozzle flow and the other to the diffuser. The mean velocity measured by the hotwire sensor 16 in each of the orientations (denoted by $U_n$ and $U_d$ for the nozzle and diffuser orientations respectively) is plotted versus the freestream velocity in FIG. 6. The results are quite consistent with the above description of the variable insert mass air flow sensor with the velocity measurement at the nozzle entrance being substantially lower than that at the diffuser exit. Both velocities seem to be related to the freestream velocity through a multiplicative constant (as seen from the fact that both $U_n$ and $U_d$ appear to follow a straight line that pass through the origin). Moreover, the ratio of $U_n/U_d$ remains practically independent of flow velocity (within less than 1%) and equal to 1.74 (note that the area ratio of the variable insert is approximately 2).

Figure 6A:
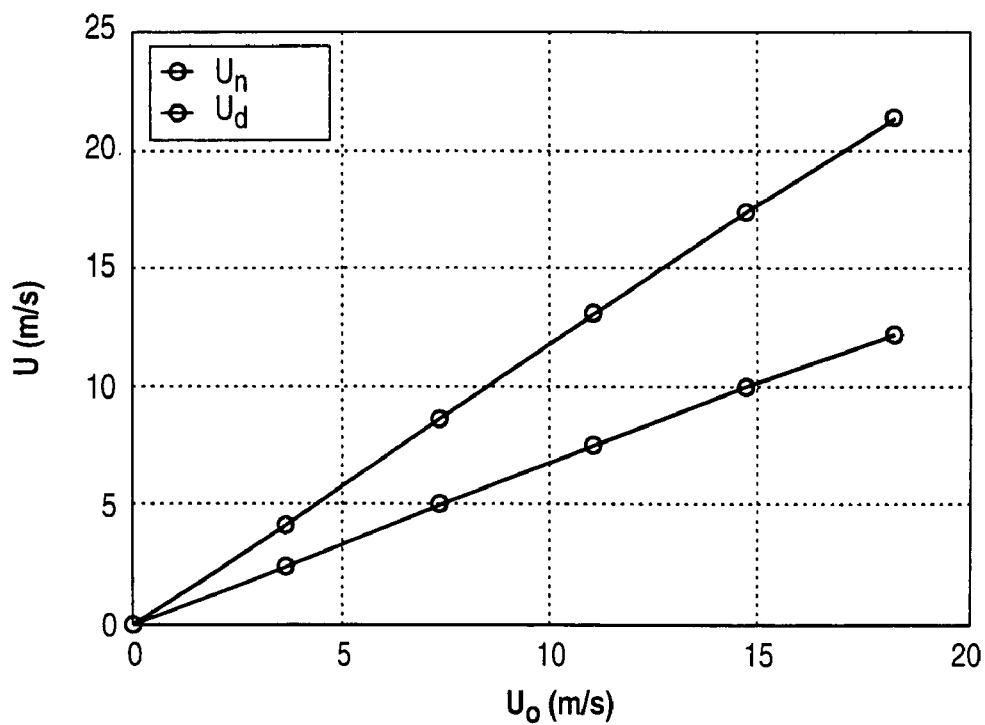
FIGS. 6A and 6B represent the measured velocity of the mass air flow sensor shown in FIGS. 4A and 4B.
Figure 6B:
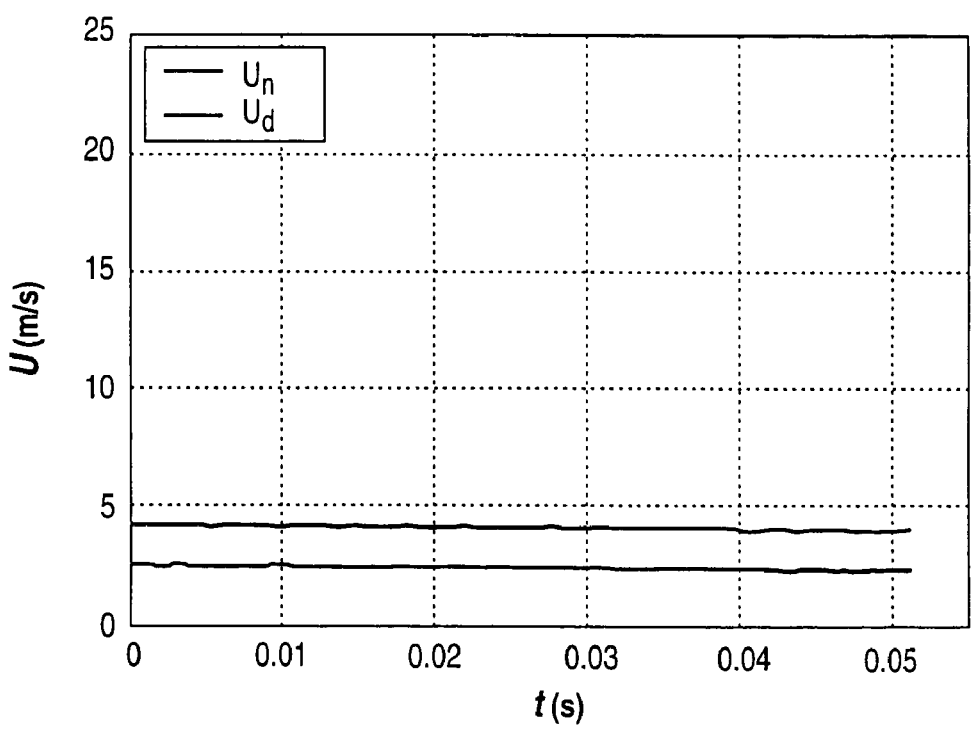

The results in FIGS. 6A and 6B provide evidence that the variable inset mass air flow sensors should work well for measuring the magnitude and direction of steady flows. Two sample time series obtained at the lowest and highest values of the freestream velocity are displayed in the top and bottom plots of FIG. 7, respectively. In each plot, two time series are displayed corresponding to the diffuser and nozzle orientation for the same freestream velocity. Also note that the bandwidth of the measurements has been limited to 500 Hz, which is well above that of a typical automotive hotwire sensor 16.

Figure 7:
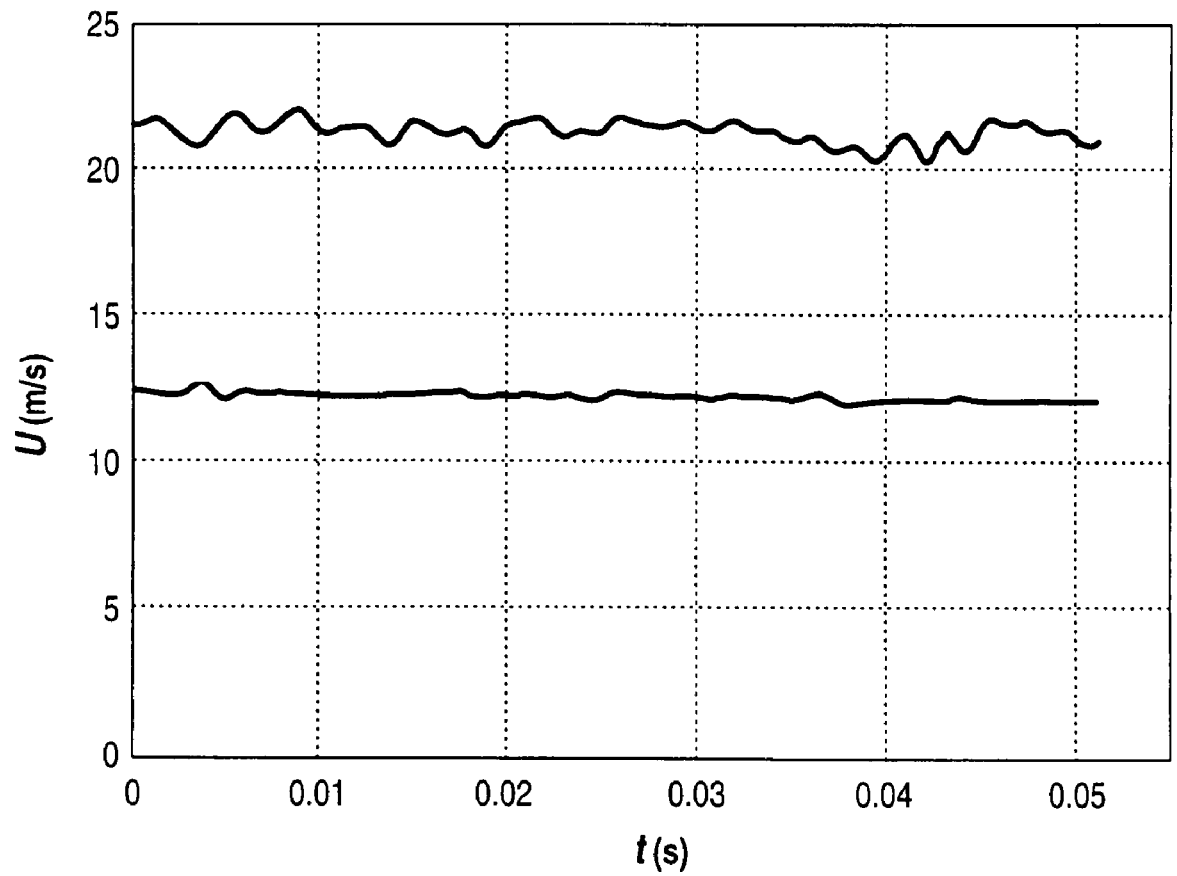
FIG. 7 represents a sample velocity vs. time series of data of the sensor shown in FIG. 4.

FIG. 7 shows that for both freestream velocities, the measurement at the nozzle inlet is free of any significant unsteadiness. Some unsteadiness, however, is found for the measurements at the exit of the diffuser for the high flow velocity. Nevertheless, this unsteadiness is substantially smaller than the difference between $U_n$ and $U_d$, and therefore it should not result in any ambiguity in determining the flow direction. Similarly, the influence of this small unsteadiness on the velocity-magnitude determination could be remedied by using the output from the sensor at the entrance of the nozzle for the magnitude measurement.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A mass air flow sensor for an internal combustion engine, said sensor comprising:
   a converging nozzle, having a first conical throughbore, defining a first through axis, said first conical throughbore having first and second apertures, said first aperture having a diameter greater than the second aperture;
   a diverging nozzle having a second conical throughbore, defining a second through axis off axis of the first through axis, said second conical throughbore having third and fourth apertures, said third aperture having a diameter greater than the fourth aperture;
   a first sensor configured to measure fluid flow positioned within the first aperture; and
   a second sensor configured to measure fluid flow positioned within the third aperture.

2. The sensor according to claim 1 wherein the first and second sensors are hotwire sensors.

3. The sensor according to claim 1 wherein the first through axis is parallel to the second through axis.

4. The sensor according to claim 1 wherein the first aperture defines a first surface and the second aperture defines a second surface, said first and second surfaces being parallel.

5. The sensor according to claim 4 wherein the third aperture defines a third surface said first and third surface being parallel.

6. The sensor according to claim 1 wherein the first throughbore has a first length and the second throughbore has a second length equal to the first length.

7. The sensor according to claim 1 wherein the first length is less than two times a diameter of the second aperture.

8. The sensor according to claim 1 further comprising a processor for receiving a first signal indicative of a first flow rate in a first direction from the first sensor and second signal from the second sensor indicative of a second flow rate.

9. The sensor according to claim 8 wherein the processor determines the difference between the first and second signals.

10. A mass air flow sensor for an internal combustion sensor:
    a converging nozzle, having a first conical throughbore with a first throughbore axis, said first throughbore having first and second apertures, said first aperture having a diameter greater than the second aperture;
    a diverging nozzle having a second conical throughbore having a second through axis parallel to the first axis, said throughbore having third and fourth apertures, said third aperture having a diameter greater than the fourth aperture;
    a first hotwire sensor positioned within the first aperture; and
    a second hotwire sensor positioned within the third aperture.

11. The sensor according to claim 10 wherein the first hotwire sensor is configured to provide a first signal in response to flow in a first direction and a second signal in response to flow in a second direction.

12. The sensor according to claim 10 wherein the first aperture and the third aperture are equal in size.

13. The sensor according to claim 10 wherein the converging nozzle and the diverging nozzle are the same size.

14. The sensor according to claim 10 wherein the first throughbore has a first length and the second throughbore has a second length equal to the first length.

15. The sensor according to claim 10 wherein the first length is less than two times a diameter of the second aperture.

16. The sensor according to claim 10 further comprising a processor for receiving a first signal indicative of a first flow rate from the first sensor and a second signal from the first sensor indicative of a second flow rate.

17. The sensor according to claim 10 wherein the processor determines the difference between signals provided by the first and second hot wire sensors.

18. An internal combustion engine comprising:

an air intake;

a mass air flow sensor disposed within the air intake, said mass air flow sensor having a converging nozzle, having a first conical throughbore having a first throughbore axis, said first throughbore having first and second apertures, said first aperture having a diameter greater than the second aperture, said mass air flow sensor further having a diverging nozzle, having a second conical throughbore, and having a second throughbore axis, said throughbore having third and fourth apertures, said third aperture having a diameter greater than the fourth aperture;

a first sensor positioned within the first aperture, and a second sensor positioned within the third aperture, wherein said first throughbore axis is off axis of the second throughbore axis.

19. The engine according to claim 18 wherein the first axis is parallel to the second axis.

20. The engine according to claim 18 wherein the first aperture defines a first surface and the second aperture defines a second surface, said first and second surfaces being parallel.

21. The engine according to claim 20 wherein the third aperture defines a third surface said second and third surfaces being coplanar.

22. The engine according to claim 18 wherein the first throughbore has a first length and the second throughbore has a second length equal to the first length.

23. The engine according to claim 18 wherein the first length is less than two times the diameter of the second aperture.

24. The engine according to claim 18 further comprising a processor for receiving a first signal indicative of a first flow rate from the first sensor and second signal from the second sensor indicative of a second flow rate.

25. The engine according to claim 24 wherein the processor determines the difference between the first and second signals.

* * * * *

UNITED STATES PATENT AND TRADEMARK OFFICE
CERTIFICATE OF CORRECTION

| | | |
|---|---|---|
| PATENT NO. | : 7,555,945 B2 | Page 1 of 1 |
| APPLICATION NO. | : 11/893105 | |
| DATED | : July 7, 2009 | |
| INVENTOR(S) | : Ahmed M. Naguib et al. | |

It is certified that error appears in the above-identified patent and that said Letters Patent is hereby corrected as shown below:

Column 1, line 4, Please add the following paragraph immediately following the title of the invention:
 --STATEMENT OF GOVERNMENT INTEREST
 A portion of this invention was made with U.S. Government support under Contract No. DE-FC26-05NT42481 awarded by the Department of Energy. The government may have certain rights in this invention.--.

Column 2, line 7, "net the" should be --the net--.

Column 3, line 56, "1implementation" should be --implementation--.

Column 4, line 1, "if" should be --is--.

Column 4, line 15, after "nozzle", insert --and--.

Column 4, line 25, "through axis" should be --through axes;--.

Column 4, line 29, after "third surface 38", insert --,--.

Column 6, line 28, Claim 5, after first occurrence of "surface", insert --,--.

Column 8, line 10, Claim 21, after "surface", insert --,--.

Signed and Sealed this

Sixth Day of October, 2009

David J. Kappos
*Director of the United States Patent and Trademark Office*